(12) United States Patent
Christensen et al.

(10) Patent No.: US 7,690,604 B2
(45) Date of Patent: Apr. 6, 2010

(54) RUDDER PEDAL ASSEMBLY INCLUDING NON-PARALLEL SLIDE RAILS

(75) Inventors: Donald J. Christensen, Phoenix, AZ (US); Casey Hanlon, Queen Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 282 days.

(21) Appl. No.: 11/688,701

(22) Filed: Mar. 20, 2007

(65) Prior Publication Data

US 2008/0105790 A1 May 8, 2008

Related U.S. Application Data

(60) Provisional application No. 60/857,268, filed on Nov. 6, 2006.

(51) Int. Cl.
*B64C 19/02* (2006.01)
(52) U.S. Cl. ............... 244/235; 244/220; 244/221; 114/144 R; 114/153
(58) Field of Classification Search ............. 244/235, 244/221, 220; 180/315, 326, 334–336; 114/363, 114/144 R, 153; 74/512, 478, 478.5, 560, 74/562.5
See application file for complete search history.

(56) References Cited

U.S. PATENT DOCUMENTS

| 1,844,607 | A | * | 2/1932 | Sikorsky | 244/229 |
|---|---|---|---|---|---|
| 2,424,523 | A | * | 7/1947 | Watter | 244/235 |
| 3,359,821 | A |  | 12/1967 | Beardsley et al. | |
| 3,489,376 | A | * | 1/1970 | Steffen et al. | 244/50 |
| 4,470,570 | A | * | 9/1984 | Sakurai et al. | 244/235 |
| 4,848,708 | A | * | 7/1989 | Farrell et al. | 244/235 |
| 5,010,782 | A | * | 4/1991 | Asano et al. | 74/512 |
| 5,056,742 | A | * | 10/1991 | Sakurai | 244/235 |
| 5,878,981 | A | * | 3/1999 | Dewey | 244/190 |
| 6,612,252 | B2 | * | 9/2003 | King et al. | 114/153 |
| 6,782,775 | B2 | * | 8/2004 | Hayashihara | 74/512 |
| 2005/0016319 | A1 | * | 1/2005 | Kiczek et al. | 74/512 |

OTHER PUBLICATIONS

EP Search Report, EP 07120026.5 dated Apr. 8, 2008.

* cited by examiner

*Primary Examiner*—Michael R Mansen
*Assistant Examiner*—Philip J Bonzell
(74) *Attorney, Agent, or Firm*—Ingrassia Fisher & Lorenz, P.C.

(57) ABSTRACT

A rudder pedal assembly exhibits sufficient ergonomic feel for a pilot, and is relatively small in overall size. The rudder pedal assembly includes a plurality of rails disposed non-parallel to each other within a common plane, and a rudder pedal. The rudder pedal is movably coupled to the plurality of rails and is configured to receive an input force in at least a first direction and a second direction. The rudder pedal is further configured, in response to the input force, to move along a path constrained by the plurality of rails in at least the first direction and the second direction, respectively, and within the common plane.

11 Claims, 6 Drawing Sheets

RUDDER PEDAL ASSEMBLY INCLUDING NON-PARALLEL SLIDE RAILS

CROSS-REFERENCES TO RELATED APPLICATIONS

This application claims the benefit of U.S. Provisional Application No. 60/857,268, filed Nov. 6, 2006.

TECHNICAL FIELD

The present invention relates to a rudder pedal assembly and, more particularly, to rudder pedal assembly that includes non-parallel slide rails that provide improved ergonomic performance.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers.

The positions of the aircraft flight control surfaces are typically controlled using a flight control surface actuation system. The flight control surface actuation system, in response to position commands that originate from either the flight crew or an aircraft autopilot, moves the aircraft flight control surfaces to the commanded positions. For example, during flight the pilot positions the primary flight control surfaces via a yoke or control stick and a pair of foot pedals. In particular, the pilot may control the position of the elevators, and thus aircraft pitch, by moving the yoke or control stick in a relatively forward or rearward direction. The pilot may control the positions of the ailerons, and thus aircraft roll, by moving (or rotating) the yoke or control stick in the left or right direction (or in the clockwise or counterclockwise direction). Moreover, the pilot may control the position of the rudder, and thus aircraft yaw, by positioning a pair of right and left rudder pedals using their foot. It is noted that in addition to being used to position the rudder, the rudder pedals may also be used to apply the brakes to the landing gear wheels.

The rudder pedals are configured to articulate during operation, so as to provide an ergonomically correct feel for the pilot. Typically, this ergonomic feel is obtained using relatively long, pivotally mounted lever arms that are coupled to a system of mechanical mechanisms, such as rods and linkages. These mechanical mechanisms are disposed below the cockpit floor, and are used to convert rudder pedal movements into rudder movement commands. Although useful, safe, and robust, present rudder pedal assemblies are typically relatively large in size and complexity. Current aircraft manufacturers desire smaller sized rudder pedal assemblies.

Hence, there is a need for a rudder pedal assembly that exhibits sufficient ergonomic feel for the pilot, and that is relatively small in overall size. The present invention addresses at least these needs.

BRIEF SUMMARY

The present invention provides a rudder pedal assembly that exhibits sufficient ergonomic feel for the pilot, and that is relatively small in overall size.

In one embodiment, and by way of example only, a rudder pedal assembly includes a plurality of rails disposed non-parallel to each other within a common plane, and a rudder pedal. The rudder pedal is movably coupled to the plurality of rails and is configured to receive an input force in at least a first direction and a second direction. The rudder pedal is further configured, in response to the input force, to move along a path constrained by the plurality of rails in at least the first direction and the second direction, respectively, and within the common plane.

In another exemplary embodiment, a rudder pedal assembly includes a first plurality of rails, a second plurality of rails, a first rudder pedal, and a second rudder pedal. The first plurality of rails are disposed non-parallel to each other within a first common plane, and the second plurality of rails are disposed non-parallel to each other within a second common plane. The first rudder pedal is movably coupled to the first plurality of rails and is configured to receive a first input force in at least a first direction and a second direction. The first rudder pedal is further configured, in response to the first input force, to move along a path constrained by the first plurality of rails in at least the first direction and the second direction, respectively, and within the first common plane. The second rudder pedal is movably coupled to the second plurality of rails and is configured to receive a second input force in at least the first direction and the second direction. The second rudder pedal is further configured, in response to the second input force, to move along a path constrained by the second plurality of rails in at least the first direction and the second direction, respectively, and within the second common plane.

Other independent features and advantages of the preferred rudder pedal assembly will become apparent from the following detailed description, taken in conjunction with the accompanying drawings which illustrate, by way of example, the principles of the invention.

BRIEF DESCRIPTION OF THE DRAWINGS

Embodiments of the present invention will hereinafter be described in conjunction with the following drawing figures, wherein like numerals denote like elements, and wherein.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description.

Figure 1:
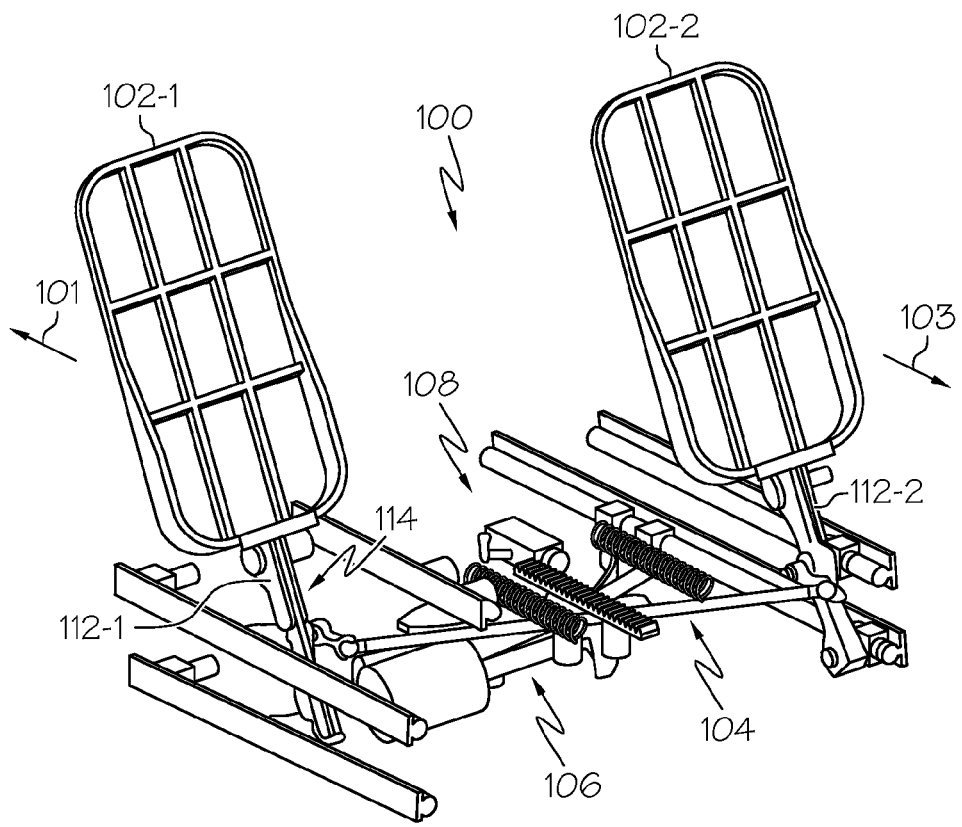
FIG. 1 is a plan view of an embodiment of a rudder pedal assembly according on an exemplary embodiment of the present invention.
Figure 2:
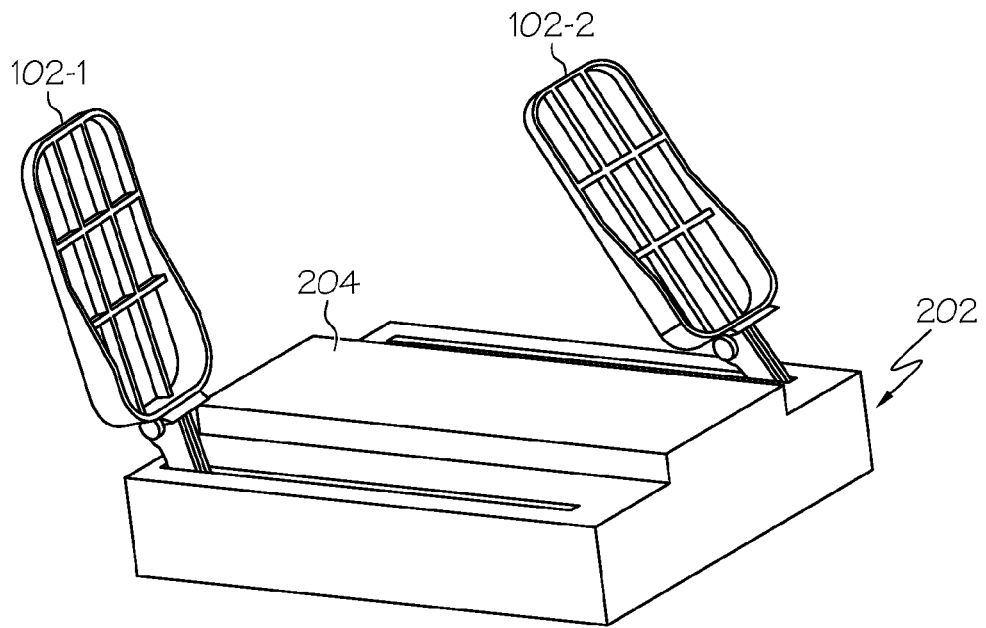
FIG. 2 is a plan view of the rudder pedal assembly of FIG. 1 disposed within an enclosure.

Turning now to FIG. 1, a plan view of an exemplary embodiment of an active rudder pedal system 100 is depicted, and includes a pair of rudder pedals 102 (102-1, 102-2), a force transfer mechanism 104, a rudder position command unit 106, and a position adjustment assembly 108. The system 100 is partially disposed within an enclosure 202, such as the one depicted in FIG. 2. Preferably, the rudder pedals 102 extend through a portion of the enclosure 202, which may be a cockpit floor board 204, and are configured to receive an input force from, for example, a pilot's foot and, in response to the received force, to move. Returning again to FIG. 1, it is seen that the rudder pedals 102 are each coupled to the force transfer mechanism 104, which is in turn coupled to the rudder position command unit 106. In the depicted embodiment, the rudder pedals 102 are coupled to the force transfer mechanism 104 via a pair of pedal arms 112 (112-1, 112-2). In particular, at least in the depicted embodiment, the rudder pedals 102 are each coupled to one of the pedal arms 112, and at least one pedal 102 is coupled to a brake rod assembly 114.

Figure 3:
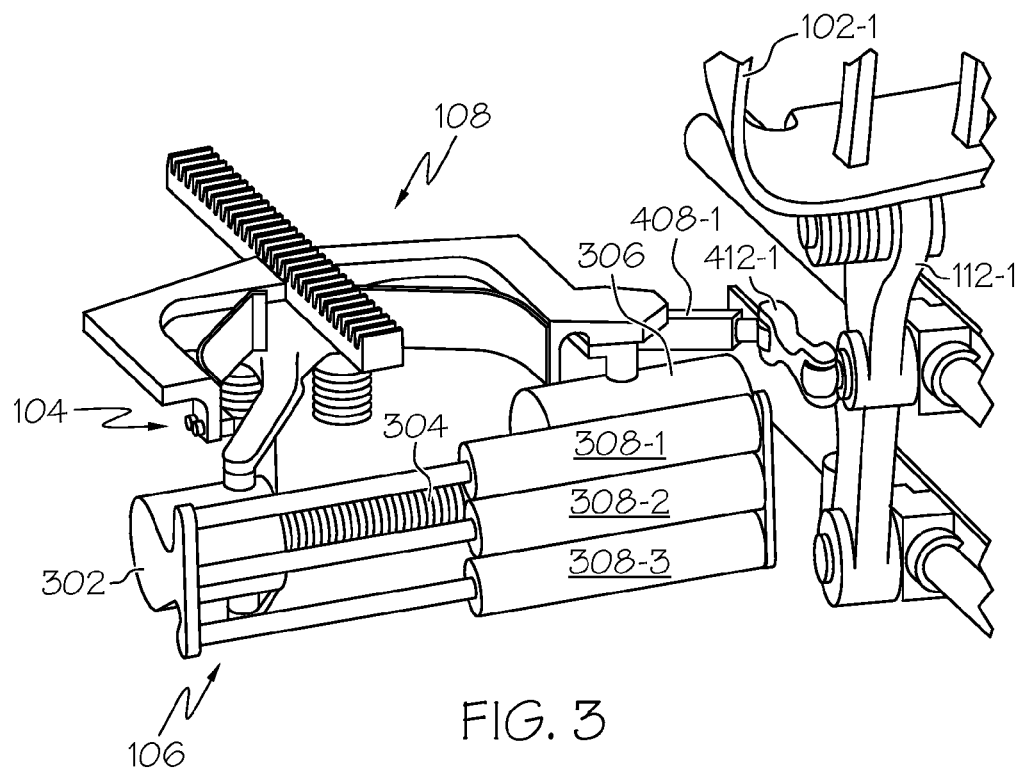
FIGS. 3 and 4 are close-up top and bottom plan views, respectively, of a portion of the rudder pedal assembly of FIG. 1, more clearly depicting various components thereof.

The force transfer mechanism 104 is configured to selectively transfer the input force supplied to the rudder pedals 102 to the rudder position command unit 106. In particular, the force transfer mechanism 104 is configured to transfer the input force to the rudder position command unit if the input force is in at least a first direction 101, and to not transfer the input force to the rudder position command unit 106 if the input force is in at least a second direction 103 and exceeds at least a first predetermined magnitude. A particular preferred configuration for carrying out this functionality is described further below. Before doing so, however, the rudder position command unit 106 will be briefly described. In doing so, reference should now be made to FIGS. 3 and 4.

The rudder position command unit 106 is coupled to the force transfer mechanism 104 and receives the input force that the force transfer mechanism 104 selectively transfers. When the force transfer mechanism 104 transfers the input force to the rudder position command unit 106, the rudder position command unit 106 moves to a position and supplies a rudder position command signal. The rudder position command signal 106 is supplied to, for example, a flight control computer, and actuator controller, or other suitable device, which in turn supplies a suitable command that ultimately causes the aircraft rudder to move the position commanded by the pilot.

Although the rudder position command unit 106 may be implemented in accordance with any one of numerous configurations, in the depicted embodiment it includes a ball nut 302, a ball screw 304, a motor 306, and a plurality of position sensors 308. The ball nut 302 is mounted on the ball screw 304, and is coupled to each of the position sensors 146. The ball screw 304 is coupled to the motor 306 and receives a drive force from the motor 306 when the motor 306 is energized. The ball screw 304 is coupled against rotation to the force transfer mechanism 104. However, upon receipt of an input force from the force transfer mechanism 104, the ball nut 302 will translate, and cause the ball screw 304 to rotate.

Translation of the ball nut 302 is sensed by the positions sensors 308, which supply the rudder position command signal. In the depicted embodiment, three position sensors 308-1, 308-2, 308-3 are included to provide redundancy. It will be appreciated, however, that more or less than this number could be included. Moreover, in the depicted embodiment the position sensors 308 are implemented using LVDT (linear variable differential transformer) type sensors. It will additionally be appreciated that any one of numerous other sensors could also be used. For example, the sensors 308 could alternatively be implemented using RVDT (rotary variable differential transformer) type sensors.

It will be appreciated that the motor 306 is selectively energized to provide tactile or haptic feedback to the pilot. In particular, the motor 306 is selectively energized to supply a rotational drive force to the ball screw 304 in a direction opposite that which the ball screw 304 is being rotated as a result of ball nut 302 translation. The magnitude of the force supplied from the motor 306 to the ball screw 304 will preferably vary depending on flight conditions, actual rudder position, etc.

Figure 4:
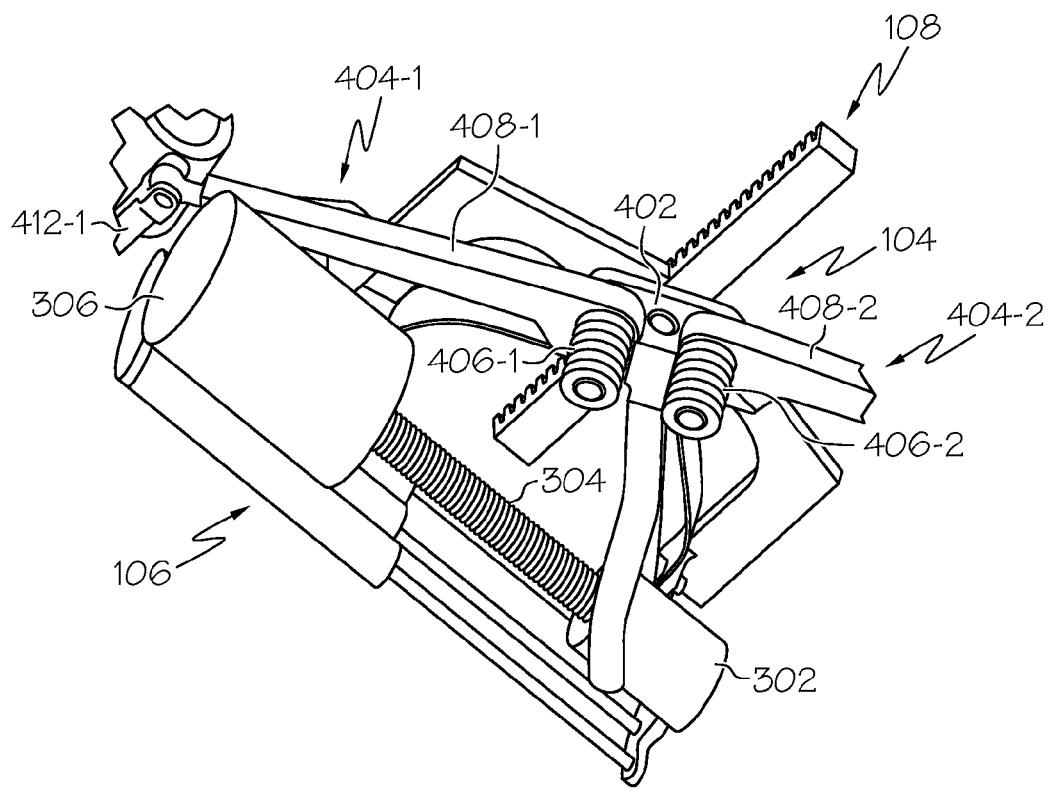

Returning now to a description of the force transfer mechanism 104, and with continued reference to FIG. 4, it is seen that the force transfer mechanism 104, at least in the depicted embodiment, includes a bell crank 402, and a pair of break-away link assemblies 404 (404-1, 404-2). The bell crank 402 is rotationally coupled to a portion of the position adjustment assembly 108, and is coupled to the rudder position command unit 106. The bell crank 402 is also rotationally coupled to each of the break-away link assemblies 404, via a pair of break-away link torsion springs 406 (406-1, 406-2).

The break-away link assemblies 404 are each coupled to the bell crank 402 and to one of the pedal arms 112. The break-away link assemblies 404 each include a break-away link 408 (408-1, 408-2) and a pedal arm link 412 (412-1, 412-2). The break-away links 408 are each rotationally coupled to the bell crank 402 via one of the break-away link torsion springs 406, and are pivotally coupled, preferably via a suitably configured rod end, to one of the pedal arm links 412. The pedal arm links 412 are in turn pivotally coupled, also preferably via a suitable rod end, to one of the pedal arms 108.

The break-away link torsion springs 406 each supply a bias torque to its associated break-away link 408 that urges the break-away link 408 to rotate toward its associated pedal arm 112, which in the depicted embodiment urges the break-away link 408 into engagement with the bell crank 402. Thus, when the pilot supplies an input force to the left-foot rudder pedal 102-1 in a first direction 101 that exceeds any force that may be simultaneously supplied to the right-foot rudder pedal 102-2 in the first direction (see FIG. 1), the supplied force is transferred, via the associated pedal arm 112-1, to the pedal arm link 412-1. As a result, the pedal arm link 412-1 is placed in tension, and transfers the force to the associated break-away link 408-1. Because the associated break-away link 408-1 is urged, via its break-away link torsion spring 406-1, into engagement with the bell crank 402, it causes the bell crank 402 to rotate, and supply a transfer force to the rudder position command unit 106. As the bell crank 402 rotates it supplies a force that urges the other break-away link 408-2 to rotate. As a result, its associated pedal arm link 412-2 is placed in tension and supplies a force to the right-foot rudder pedal 102-2 that causes the right-foot rudder pedal 102-2 to move in a second direction 103 (see FIG. 1). It will be understood that the system 100 operates substantially identically when a force is supplied to the right-foot rudder pedal 102-2 in the first direction 101 that exceeds any force that may be simultaneously supplied to the left-foot rudder pedal 102-1 in the first direction 101.

From the above-described description of the force transfer mechanism 104, it will additionally be appreciated that if either or both of the rudder pedals 102 and/or pedal arms 112 is supplied with a force in the second direction 103, the force will be transferred to the associated pedal arm link 412 (or links), placing the pedal arm link 412 (or links) in compression. If the compressive force exceeds a predetermined magnitude, which is preferably established by the associated break-away link torsion springs 406, the associated break-away link 408 (or links) rotates away from the bell crank 402. Thus, this rotation of the break-away link 408 (or links) does not result in a concomitant rotation of the bell crank 402, and the rudder position command signal supplied from the rudder position command unit 106 is unchanged as a result of this rudder pedal motion. It will be appreciated that a force may be supplied to the rudder pedals 102 and/or pedal arms 112 in the highly unlikely event of an unintentional strike by an object that, for example, strikes and then penetrates the aircraft fuselage. For example, it is postulated that a bird could unintentionally cause such an event. It will additionally be appreciated that in alternative embodiments, the links 408 could be configured as solid, non-break-away type of links, if needed or desired.

Figure 5:
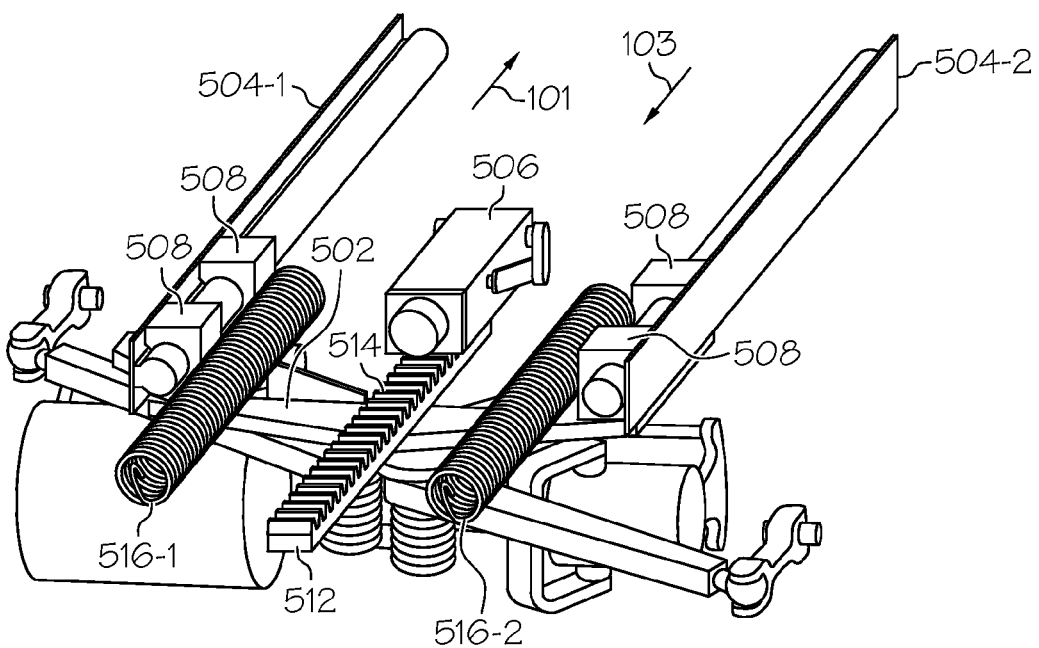
FIG. 5 is a plan view of the rudder pedal assembly of FIG. 1 without the associated rudder pedals and rails coupled thereto.

The rudder pedals 102 (102-1, 102-2), force transfer mechanism 104, and rudder position command unit 106, are all coupled to the position adjustment assembly 108. The position adjustment assembly 108, which is depicted more clearly in FIG. 5, is configured to allow the rudder pedals 102 to be adjusted to a plurality of positions for different pilots. To do so, the depicted position adjustment assembly 108 includes a frame 502, a plurality of adjustment rails 504 (504-1, 504-2), and a lock/release mechanism 506. The frame 502 mounts the force transfer mechanism 104 and the rudder position command unit 106. More specifically, the force transfer mechanism bell crank 402 is rotationally mounted to the frame 502, and is coupled to the rudder position command unit motor 306. The frame 502 is also movably coupled to each of the adjustment rails 504. More specifically, the frame is coupled to a plurality of slide couplings 508, which are turn each movably coupled to, and slidable on, one of the adjustment rails 504. The frame 502 additionally includes an elongate section 512 that extends in the first and second directions 101, 103 and has a plurality of notches 514 formed therein. The notches 514 are used, in conjunction with the lock/release, to lock the frame 502, and thus the rudder pedals 102, in a desired position.

Figure 6:
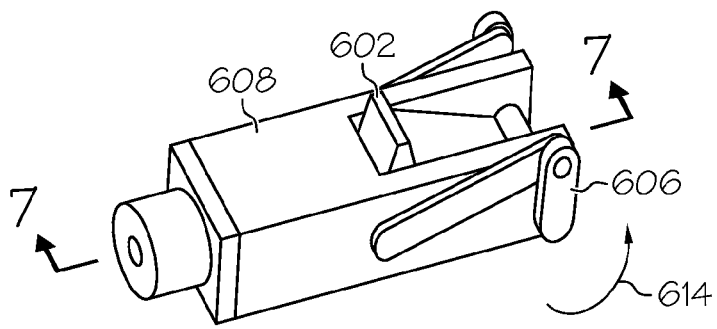
FIG. 6 is a close up view of an exemplary lock/release mechanism that may be used to implement the rudder pedal assembly depicted in FIGS. 1-5.
Figure 7:
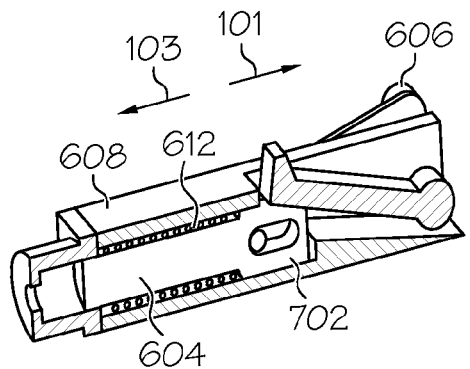
FIG. 7 is a cross section view of the exemplary lock/release mechanism taken along line 7-7 in FIG. 6.

The lock/release mechanism 506, an embodiment of which is shown more clearly in FIGS. 6 and 7, includes a latch 602, an engage/disengage pin 604, and a user interface mechanism 606, all mounted on or within a main body 608. The latch 602 is rotationally mounted on the main body 608 and is configured to fit within one of the notches 514 formed within the frame elongate section 512. The engage/disengage pin 604 selectively urges the latch 602 to rotate, when the lock/release mechanism 506 is appropriately mounted, toward the frame elongate section 512. As best seen in FIG. 7, a bias spring 612 is disposed between the engage/disengage pin 604 and the main body 608 and urges the engage/disengage pin 604 in the first direction 101 and against a stop 702 formed in the main body 608. As the engage/disengage pin 604 moves toward the stop 702 it rotates the latch 602 toward the frame elongate section 512.

From the above it may be appreciated that in order to move the rudder pedals 102 to another position the latch 602 needs to be removed from the notch 514 within which it is presently inserted. The user interface mechanism 606 facilitates this removal by allowing a user to move the engage/disengage pin 604 in the second direction 103. More specifically, the user interface mechanism 606 is rotationally coupled to the main body 608 and engages the engage/disengage pin 604. When a user rotates the user interface mechanism 606 in the appropriate direction 614, it moves the engage/disengage pin 604 in the second direction 103. As a result, the engage/disengage pin 604 no longer urges the latch 602 toward the frame elongate section 512, and the user may remove the latch 602 from the notch 514 within which it is inserted. The user may then move the rudder pedals 102 to the desired position and release the latch 602 and user interface mechanism 606, and the rudder pedals 102 will then be locked in place in the desired position.

Figure 8:
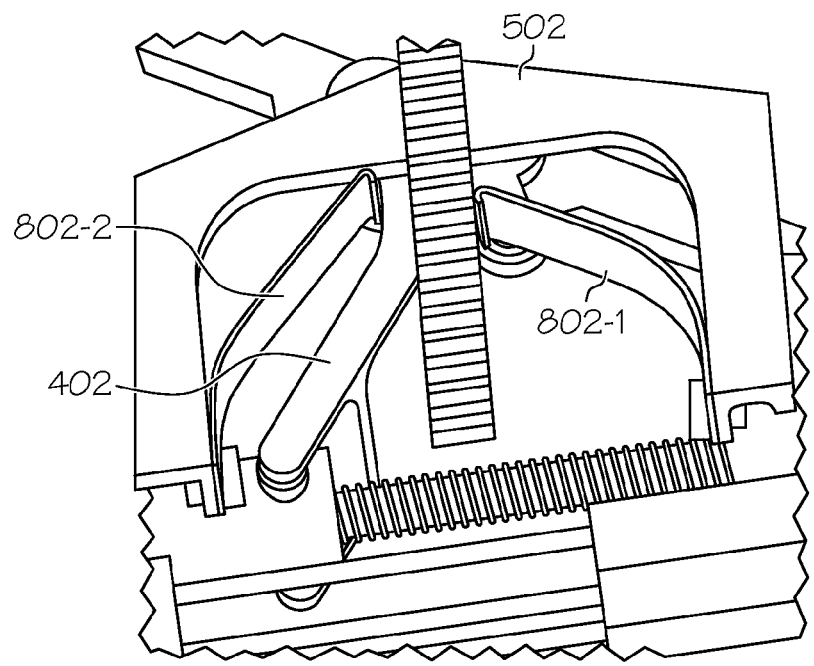
FIG. 8 is a close-up plan view of a section of the rudder pedal assembly depicted in FIGS. 1-5, more clearly depicting null position mechanisms.

Before proceeding further is noted that FIGS. 1 and 5 also depict a plurality of tension springs 516 (516-1, 516-2). The tension springs 516 are each coupled to the frame 502 and to a non-illustrated fixed structure, and supply a bias force that urges the position adjustment assembly 108 toward the second direction 103. Moreover, and as shown most clearly in FIG. 8, a pair of pedal null-position bias mechanisms 802 (802-1, 802-2) are preferably coupled to the frame 502. The pedal null-position mechanisms 802 each supply a bias force to the pedals 102 that urges the pedals 102 toward the null position. Although the particular configuration may vary, in the depicted embodiment these mechanisms 802 are implemented as a pair of leaf springs that are coupled to the frame 502, and the engage, or at least selectively engage, the bell crank 402 when the bell crank 402 rotates from its null position.

Figure 9:
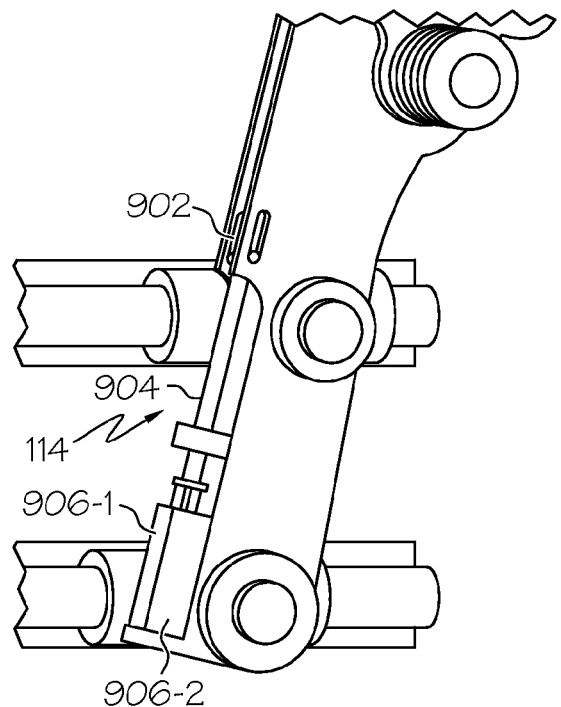
FIG. 9 is a close-up plan view of a rudder pedal arm that is used to implement the rudder pedal assembly depicted in FIGS. 1-5, more clearly depicting a brake rod assembly.

It was noted above that at least one pedal 102 is coupled to a brake rod assembly 114. Turning now to FIG. 9 an exemplary embodiment of the brake rod assembly 114 is at least partially depicted, and includes at least a first rod 902, and a second rod 904. The first rod 902, which is only partially visible in FIG. 9, is rotationally coupled at one end to its associated brake pedal 102 and at another end to the second rod 904. The second rod 904 is coupled at one end to the first rod 902 and at another end to a pair of position sensors 906 (906-1, 906-2). The position sensors 906 are configured to sense the position of the second rod 904 and supply a brake signal representative thereof. The brake signal is ultimately supplied to another system that uses it to actuate the aircraft brakes on the appropriate aircraft wheel or wheels. Although two position sensors 906 are associated with the brake rod assembly 114 for redundancy, more or less than this number could be used. Moreover, in the depicted embodiment the position sensors 906 are each implemented using LVDT (linear variable differential transformer) type sensors. It will additionally be appreciated that any one of numerous other sensors could also be used. For example, the sensors 906 could alternatively be implemented using RVDT (rotary variable differential transformer) type sensors.

Figure 10:
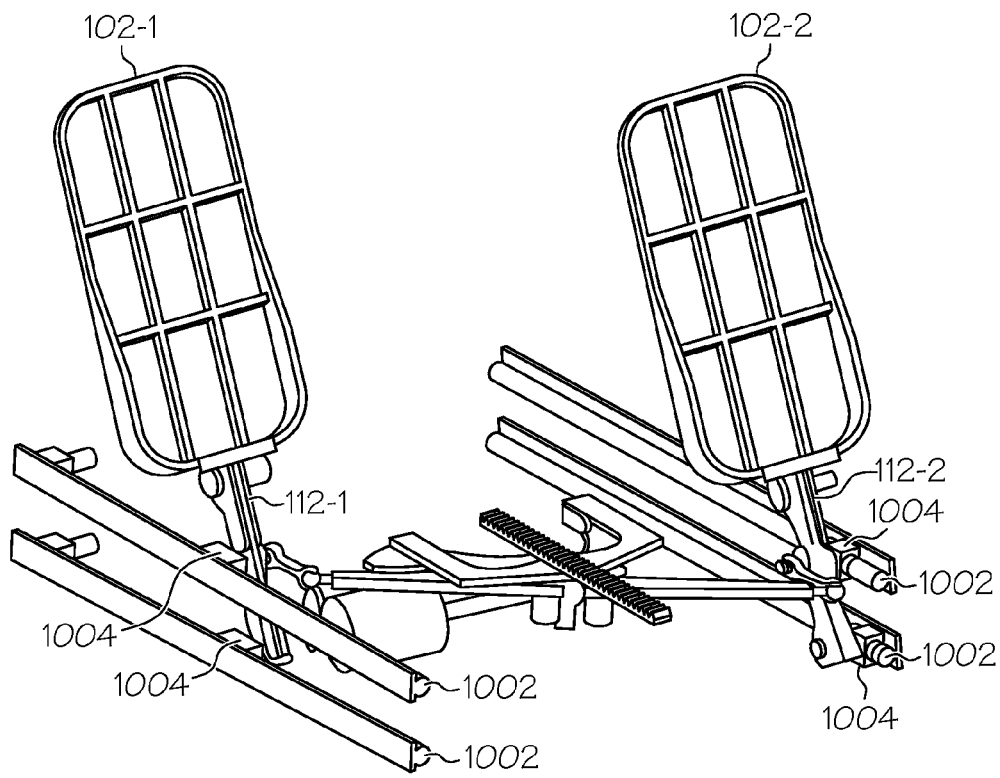
FIGS. 10 and 11 are top and bottom plan views, respectively, of the rudder pedal assembly of FIG. 1 with portions of a position adjustment assembly removed.
Figure 11:
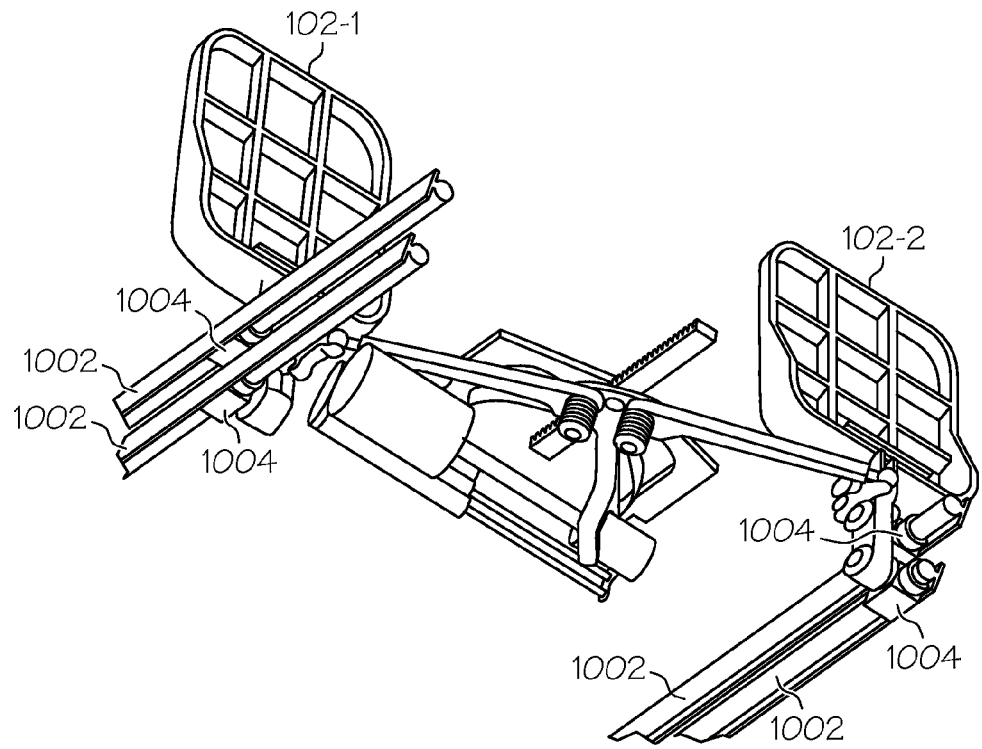

Referring now to FIGS. 10 and 11, top and bottom views, respectively, of the active rudder pedal system 100 are depicted with portions of the position adjustment assembly 108 removed for clarity. The rudder pedals 102 are each movably coupled, preferably via its associated pedal arm 112, to a pair of rails 1002. More specifically, each pedal arm 112 is rotationally coupled to its associated pair of rails 1002 via a pair of slidable couplings 1004. The rails 1002 associated with each rudder pedal 102 are preferably disposed in a common plane. However, the rails 1002 associated with each rudder pedal 102 are additionally disposed non-parallel to one another in the common plane. It will additionally be appreciated that the rails 1002 could be implemented using any one of numerous suitable linear mechanisms, and not just the rails that are depicted.

Figure 12:
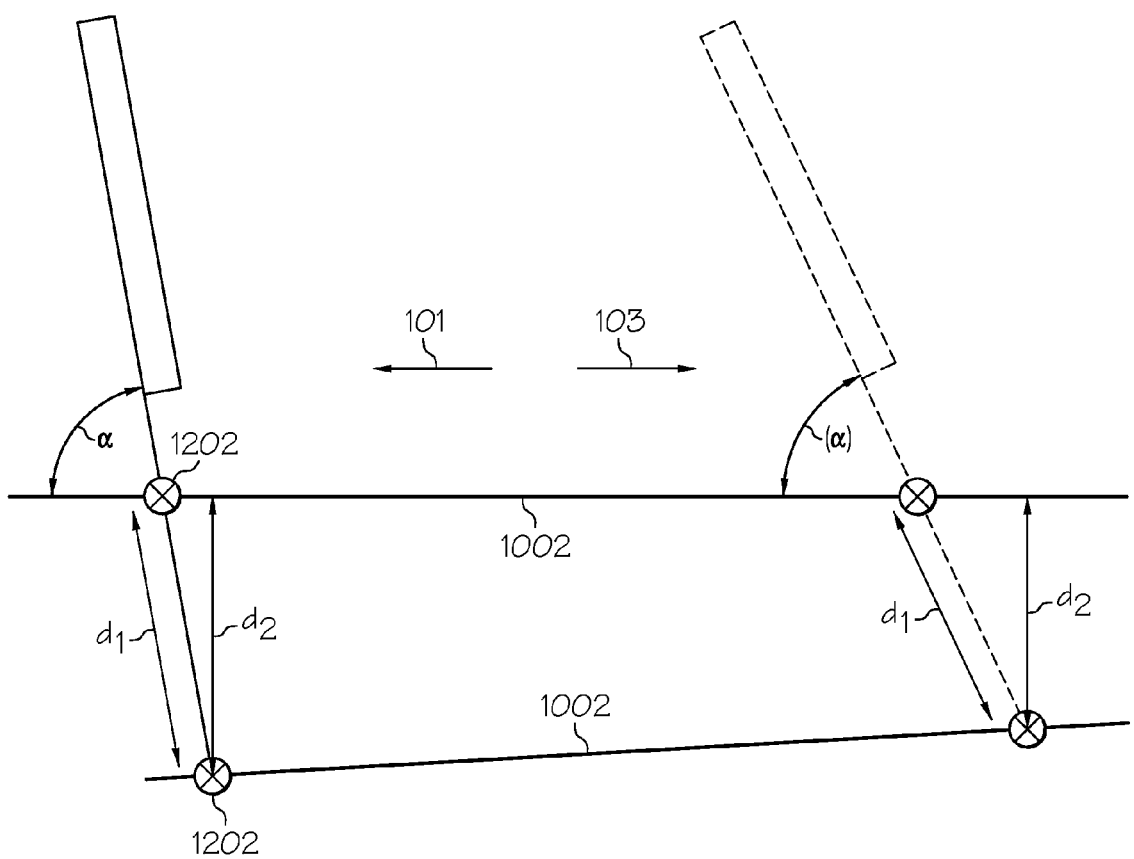
FIG. 12 is a schematic representation of one rudder pedal and an associated pair of rails that are used to implement the rudder pedal assembly of FIG. 1.

The above-described configuration for a single rudder pedal 102 and an associated pair of rails 1002 is shown schematically, and more clearly, in FIG. 12 where it is seen that the rotational interface between the pedal arms 112 and the associated slidable couplings 1004 define a pair of pivot axes 1202. As the pedal 102 translates along the pair of rails 1002, in either the first 101 or second 103 directions, the pivot axes 1202 remain a fixed linear distance ($d_1$) apart even though the distance (d2) between the pair of rails 1002 varies. As a result, the relative angle ($\alpha$) of the pedal 102 also varies. It will be appreciated that the angle between the rails 1002 of each pair may be varied to obtain a desired pedal angle variation over the translation length.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A rudder pedal assembly, comprising:
   a first plurality of rails disposed non-parallel to each other within a first common plane;
   a second plurality of rails disposed non-parallel to each other within a second common plane;
   a first rudder pedal movably coupled to, and movable relative to each of, the first plurality of rails and configured to receive a first input force in at least a first direction and a second direction, the first rudder pedal configured, upon receipt of the first input force in the first direction, to move relative to an entirety of each of the first plurality of rails and along a path constrained by the first plurality of rails in the first direction and within the first common plane and, upon receipt of the first input force in the second direction, to move relative to an entirety of each of the first plurality of rails and along a path constrained by the first plurality of rails in the second direction and within the first common plane;
   a second rudder pedal movably coupled to the second plurality of rails and configured to receive a second input force in at least the first direction and the second direction, the second rudder pedal configured, upon receipt of the second input force in the first direction, to move relative to an entirety of each of the second plurality of rails along a path constrained by the second plurality of rails in the first direction and within the second common plane and, upon receipt of the second input force in the second direction, to move relative to an entirety of each of the second plurality of rails along a path constrained by the second plurality of rails in the second direction and within the second common plane;
   a brake command transfer mechanism coupled to the first rudder pedal and configured, upon rotation of the first rudder pedal, to move to a position; and
   a brake command supply unit coupled to the brake command transfer mechanism and configured, upon movement of the brake command transfer mechanism, to supply a brake signal representative of the position.

2. The rudder pedal assembly of claim 1, further comprising:
   a first pedal arm coupled to the first rudder pedal and to each of the first plurality of rails at one of a plurality of different fixed positions on the first pedal arm; and
   a second pedal arm coupled to the second rudder pedal and to each of the second plurality of rails at one of a plurality of different fixed positions on the second pedal arm.

3. The rudder pedal assembly of claim 2, wherein:
   the first and second rudder pedals are rotationally coupled to the first and second pedal arms, respectively; and
   the first and second pedal arms are slidably coupled to each of the first and second plurality of rails, respectively.

4. The rudder pedal assembly of claim 3, wherein the first and second pedal arms are configured to rotate relative to each of the first and second plurality of rails, respectively.

5. The rudder pedal assembly of claim 1, further comprising:
   a rudder position command unit configured to receive a transfer force representative of a rudder command and operable, upon receipt of the force, to move to a position and supply a rudder position command signal; and
   a force transfer mechanism coupled to the first and second rudder pedals and to the rudder position command unit, the force transfer mechanism responsive to the first and second input forces supplied to the first and second rudder pedals, respectively, to supply the transfer force to the rudder position command unit at least when one of the first or second input forces are supplied in the first direction.

6. The rudder pedal assembly of claim 5, further comprising:
   a null position mechanism disposed at least adjacent to the force transfer mechanism and configured to at least selectively supply a bias force to the force transfer mechanism in the second direction when at least one of the first or second input forces is supplied in the first direction.

7. The rudder pedal assembly of claim 6, wherein the null position mechanism comprises a plurality of leaf springs.

8. The rudder pedal assembly of claim 1, wherein the brake command transfer mechanism comprises:
   a first rod having a first end and a second end and configured to translate in response to rotation of the first rudder pedal, the first rod first end rotationally coupled to the first rudder pedal; and
   a second rod having a first end and a second end and configured to translate to the position in response to translation of the first rod, the second rod first end coupled to the first rod second end, and the second rod second end coupled to the brake command supply unit.

9. The rudder pedal assembly of claim 8, wherein the brake command supply unit comprises:
   a position sensor coupled to, and configured to sense the position of, the second rod.

10. A rudder pedal assembly, comprising:
    a first plurality of rails disposed non-parallel to each other within a first common plane;
    a second plurality of rails disposed non-parallel to each other within a second common plane;

a first rudder pedal movably coupled to, and movable relative to each of, the first plurality of rails and configured to receive a first input force in at least a first direction and a second direction, the first rudder pedal configured, upon receipt of the first input force in the first direction, to move relative to each of the first plurality of rails and along a path constrained by the first plurality of rails in the first direction and within the first common plane and, upon receipt of the first input force in the second direction, to move relative to each of the first plurality of rails and along a path constrained by the first plurality of rails in the second direction and within the first common plane;

a second rudder pedal movably coupled to the second plurality of rails and configured to receive a second input force in at least the first direction and the second direction, the second rudder pedal configured, upon receipt of the second input force in the first direction, to move relative to each of the second plurality of rails along a path constrained by the second plurality of rails in the first direction and within the second common plane and, upon receipt of the second input force the second direction, to move relative to each of the second plurality of rails along a path constrained by the second plurality of rails in the second direction and within the second common plane;

a rudder position command unit configured to receive a transfer force representative of a rudder command and operable, upon receipt of the force, to move to a position and supply a rudder position command signal;

a force transfer mechanism coupled to the first and second rudder pedals and to the rudder position command unit, the force transfer mechanism responsive to the first and second input forces supplied to the first and second rudder pedals, respectively, to supply the transfer force to the rudder position command unit at least when one of the first or second input forces are supplied in the first direction; and a plurality of leaf springs disposed at least adjacent to the force transfer mechanism and configured to at least selectively supply a bias force to the force transfer mechanism in the second direction when at least one of the first or second input forces is supplied in the first direction.

11. A rudder pedal assembly, comprising:

a first plurality of rails disposed non-parallel to each other within a first common plane, and disposed such that one of the first plurality of rails extends over at least half of another one of the first plurality of rails;

a second plurality of rails disposed non-parallel to each other within a second common plane, and disposed such that one of the second plurality of rails extends over at least half of another one of the second plurality of rails;

a first rudder pedal movably coupled to the first plurality of rails and configured to receive a first input force in at least a first direction and a second direction, the first rudder pedal configured, upon receipt of the first input force in the first direction, to move along a path constrained by the first plurality of rails in the first direction and within the first common plane and, upon receipt of the first input force in the second direction, to move along a path constrained by the first plurality of rails in the second direction and within the first common plane;

a second rudder pedal movably coupled to the second plurality of rails and configured to receive a second input force in at least the first direction and the second direction, the second rudder pedal configured, upon receipt of the second input force in the first direction, to move along a path constrained by the second plurality of rails in the first direction and within the second common plane and, upon receipt of the second input force in the second direction, to move along a path constrained by the second plurality of rails in the second direction and within the second common plane;

a brake command transfer mechanism coupled to the first rudder pedal and configured, upon rotation of the first rudder pedal, to move to a position; and a brake command supply unit coupled to the brake command transfer mechanism and configured, upon movement of the brake command transfer mechanism, to supply a brake signal representative of the position.

* * * * *